April 14, 1964
J. A. ANANIA
3,128,535
CUTTER TOOL ASSEMBLY
Filed May 14, 1962
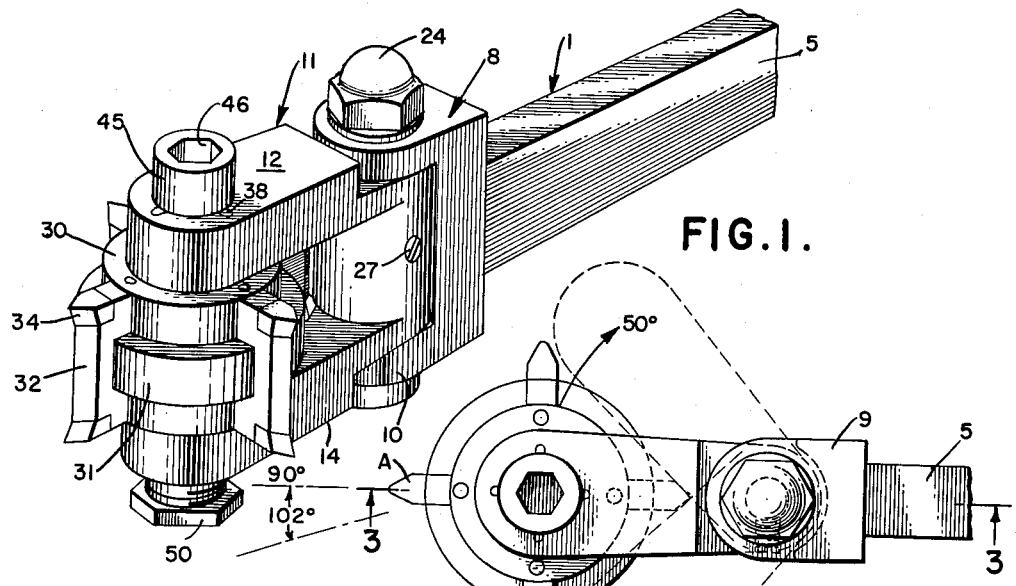
FIG. 1.
FIG. 2.
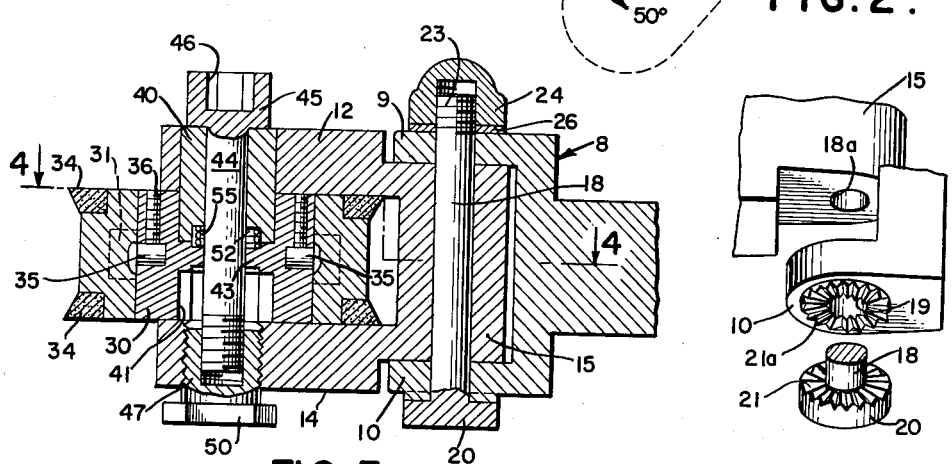
FIG. 3.
FIG. 5.
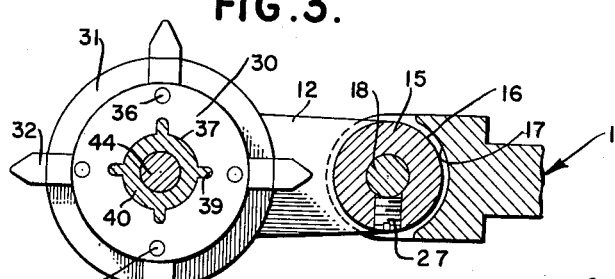
FIG. 4.
INVENTOR
James A. Anania
BY *Thomas, Weisman & Russell*
ATTORNEYS

United States Patent Office 3,128,535
Patented Apr. 14, 1964

3,128,535
CUTTER TOOL ASSEMBLY
James A. Anania, 1925 McCarter Highway, Apt. 1-D, Newark, N.J., assignor of thirty-three percent to Frederick Carlton Holle, Hasbrouck Heights, N.J., thirty-three percent to Otto Sass, Irvington, N.J., and ten percent to William J. Matt, Jr., Westfield, N.J.
Filed May 14, 1962, Ser. No. 194,538
6 Claims. (Cl. 29—98)

This invention relates to a multiple cutter bit holder and the mounting assembly therefor used in connection with the usual tool bar. More particularly, the invention revolves about a completely adjustable mounting which (a) permits setting of the bit at almost any predetermined lateral angle with respect to the tool bar depending upon the angle of cut desired by the operator, and (b) permits rapid bit change by 90° movement of an alternate, fresh bit into place while retaining other lathe adjustments as well as the angular setting just referred to.

The invention is of course directed to a unit to be used with almost any usual type of lathe and milling equipment.

In my copending application for patent, Serial No. 155,214, filed November 27, 1961, a somewhat similar arrangement is provided, but in this disclosure adjustability, insofar as the assembly directly connected to the tool bar be concerned, is confined to replacement of a worn bit by rotation of the assembly 90°, causing a new bit to be placed in the exact position of the former bit. It is true as set forth in said disclosure that such an arrangement eliminates, upon bit replacement, the requirement of many other and usual lathe adjustments which are necessary when a single or unitary bit is mounted in the usual tool bar and must be replaced after a period of cutting. The instant invention represents an improvement thereover, for in this case, not only is a new bit locked in place simply by rotation of the bit holder 90°, but the other locking mechanism on the tool bar of this invention permits an optional and further angular adjustment of almost any amount, so that, by this 90° rotation for bit replacement, such additional and preset angular inclination is retained.

The purpose of this assembly, as in the former case, is to substantially reduce the labor involved whenever in the course of dressing a piece a bit must be replaced. In other words, this invention is directed to reduction in the time element, i.e., reduction in set up, piece handling, machine handling, and in over-all cutting time for a given piece.

It is of course well known that in ordinary lathe practice, for example, numerous adjustments must be made with respect to such lathe assemblies as the lathe carriage, cross slide, etc. Hence, in ordinary practice bit replacement calls for readjustment of all these various assemblies for in the first place these settings must often be disturbed even for removal of the ordinary standard type of bit, and likewise for the insertion of a new bit. Hence, after bit replacement when it is desired to resume the cut the bit must then again be realigned, reset, and other adjustments made in the various supporting elements for the bit. This invention eliminates these various time-consuming steps. Also, and in addition to the advantages set forth and exhibited by my invention as set forth in the referred to disclosure, the instant invention enables the locking of a new bit in the same cutting position, while at the same time providing for angular deviation or angle of cut of the bit at almost any practical cutting angle. The latter adjustment enables adjustment of angle of cut without disturbing any of the ordinary lathe setings made with respect to the crossing slide, etc. Such angular adjustment is not only most useful to the operator in direct and end cutting, but is also extremely advantageous in such operations as boring and tapering.

It is accordingly an object of the invention to provide a multiple cutter bit assembly, all for mounting on the tool bar, which will permit replacement of a worn bit simply by rotation of a new bit 90° into the exact cutting position of the former bit, while at the same time permitting lateral angular adjustment of the bit with respect to the tool bar.

It is a further objective of the invention to provide means of this described type wherein such further adjusting mechanism on the tool bar enables positioning of the multiple bit holder at almost any practical angle in between the 90° angle which separates (in this case) each of the four bits mounted on the cutter head.

Another objective of the invention is the provision of a multiple bit holder which represents the essence of simplicity, but which at the same time, represents an accurate instrument of extreme durability and strength.

An additional object of the invention is the provision of means of this described type which permits the multiple bit holder to be adjusted a substantial distance from side to side with respect to the tool bar, in this instance an angular deviation of at least 50° to each side of the tool bar, with means for retention of this predetermined amount of angular setting when a new bit is rotated into place.

Finally, it is an over-all and primary objective of the invention to provide an instrument which permits maximum flexibility not only in bit adjustment, but also in ease of manipulation in the sense that bit replacement involves but a few minutes' effort on the part of the operator, in contrast to the substantially longer period of time which is normally required to make a bit change with conventional equipment.

It is to be osberved that although the multiple bit holder itself, exclusive of the angular deviation means which is here provided, appears to be somewhat similar to that found in my copending application, Serial No. 155,214, such bit holder involves a mounting means which is mechanically and operatively different. This is particularly true of the locking means which is provided and which, although simplified to the extreme, nevertheless permits locking of each of the multiple bits in position upon rotation of one of them for replacement purposes.

Other objects and advantages of the assembly of this invention will be apparent to those skilled in the art.

The invention is described in more particular in the following wherein like numerals designate like parts thereof and wherein reference is made to the following figures disclosing the invention:

FIGURE 1 is a perspective view of the invention illustrating the mounting in the "in line" position with respect to the tool bar;

FIGURE 2 is a top plan view of the invention, also diagrammatically indicating the amount of deviation permitted from such "in line" position or deviation to either side of the longitudinal axis of the tool bar;

FIGURE 3 is a section view taken on the line 3—3 of FIGURE 2;

FIGURE 4 is a section view taken on the line 4—4 of FIGURE 3; and

FIGURE 5 is an exploded perspective view of the locking arrangement enabling lateral inclination of the cutter bit mount to the longitudinal axis of the tool bar, as indicated in dotted line in FIGURE 2.

Referring more particularly to these figures, it is seen that the tool bar, generally indicated at 1, is of the usual (rectangular in cross section) shape and inclusive also of an elongated shank 5. The forward or cutting end of the tool bar terminates in a forked element or yoke generally indicated at 8 which is fabricated with upper and lower arms 9 and 10, and here shown as an integral part of the tool bar. The purpose of the fork or yoke 8 is to provide support for a complementary yoke, generally indicated at 11, the latter being pivoted to yoke 8 in a manner to be described. The yoke 11 similarly comprises two opposed and parallel arms 12 and 14 which are joined together by a suitable cross member, as at 15.

The element 15 is appropriately bored as at 18a (FIGURE 5) for the reception of a pivot pin, the latter also being seated within appropriate apertures or bores formed in the two arms 9 and 10 and as indicated at 19.

At its lower end the bolt 18 is provided with an enlarged head 20, the interior surface of this head or cap having a series of serrations or teeth 21 adapted to match a like series of serrations 21a comprising matched recesses or notches on the lower arm 10 of the yoke member 8 for the reception of the teeth 21. The opposite end of bolt 18 is threaded as at 23 to receive a nut 24 with an intermediate washer, bushing or lock washer 26 being positioned between the upper arm 9 of the yoke 8 and the bolt 24.

From this structure, it will be readily understood that when the nut 24 is slacked off the yoke 11 may then be pivoted to one side or the other with respect to the yoke 8 and the tool bar 1. Upon being positioned in the desired angular position with respect to the tool bar the yoke 11 is then locked in this angled location by the seating of the ridges 21 in the appropriate recesses or notches 21a which are complementary thereto. The bolt is then tightened and these matching serrations then lock the head or yoke 11 in the adjusted position.

It will be noted that the element 15 of the yoke 11 is rounded as shown at 16 (FIGURE 4) and that the inner surface of the yoke 8 is similarly contoured with a concave surface 17 to match the cylindrical shape 16 of the element 15, thus permitting pivoting to either side in the manner described.

With this construction, the amount of pivot permitted by this inner locking arrangement is preferably about 100°, or about 50° to each side of the longitudinal axis of the tool bar 1. The amount of angular swing of the yoke 8 with respect to the tool bar is depicted in dotted line in FIGURE 2.

The increments, in degrees, at which the cutter head may be angled and locked of course depend upon the relative number of serrations 21 and 21a. For example, if there are twenty such matching serrations in the bolt head 20, with a like number of recesses 21a in the bottom of arm 10, each notch will represent an 18° change of position. Similarly, if there are thirty such ridges or serrations, each notch will represent a 12° change in position; forty ridges will result in alternate positions, in increments, of 9°, and so on. The foregoing is diagrammatically illustrated in FIGURE 2. Here it is assumed that the bit is positioned direct to the cut or at a 90° angle with respect to the piece (shown in dotted line). If the referred to notches are thirty in number and the bit deviated from the position shown, and counterclockwise, only one notch, there is a corresponding 12° change of position represented by the dotted line designated at 102°, in other words, a 12° change making an obtuse angle with respect to the piece of 102° or an acute angle upon the other side of the bit with respect to the piece of 78°.

The reason for these allowable deviations, made as a consequence of the assembly shown in FIGURE 5, are found in a given operator's desire to slightly change the angle of cut for better performance at, for example, different selected speeds of rotation of the piece. This may thus be done, through this simplified mechanism, without alteration of any corresponding lathe settings.

In any event, the locking mechanism of FIGURE 5 permits these incremental and different variations in angle of cut. To maintain the desired relationship between the bit and tool bar, it is of course necessary that the yoke 11 be locked to the pivot pin 18. To this end a set screw 27 located midway of the member 15 is tightened against such pivot pin 18 for this purpose. This is clearly shown in FIGURE 4.

The rotating bit holder 30 is of cylindrical configuration. Similar in construction to the bit holder of the referred to disclosure, the holder 30 is provided with a circumferential flange or ridge 31, positioned intermediate the sides of the holder. The purpose of this flange is to further secure each of the bits to the holder in such fashion that during operation they remain in fixed position without a tendency to twist or otherwise be distorted to either side. To accomplish this, at 90° points around the periphery of this flange the latter is provided with vertical slots 34, the dimension of which is such as to accept each of the bits 32. It is to be appreciated that because of the appreciable thickness of the flange 31 and because such flange fits angularly against each side of each of the bits 32, appreciable movement laterally, as twisting of the bits when once so positioned, is prevented.

In the preferred embodiment of the invention, there are four such bits 32, each of which is double edged or provided with inserts comprising cutting elements 34. The cutter holder is designed for rotation to each of the described and spaced 90° points, where it is there locked in position. Thus upon one bit wearing the holder is rotated to provide a new bit surface and locked in place. When all of the bits on one side of the holder become worn, then either the holder is inverted to present the opposite cutting surface, or each individual bit can be removed from the bit support 30, and inverted to present a new cutting element.

At any rate, each of the bits is further securely locked in position in the holder by means of a lateral pin 35 which is adapted to fit into a corresponding radial bore in the bit holder, such bores also being spaced 90° with respect to each other, and located on the center line between the two sides of the holder itself. Set screws 36 in the bit holder disposed as shown at right angles to the pins 35 further lock these tool bits 32 in place.

The bit holder is provided with a lower and axial center bore 41 and a corresponding upper bore of equal dimension to receive a locking bushing, with the result being that an intermediate section or partition 43 is formed therein. This is provided with a center aperture to receive the lock bolt 44 therethrough.

This bushing 40 is of this configuration—it is provided with four side ribs 38 which are disposed in a 90° angular relationship with respect to each other, and in position to coincide with the four tool bits when these are locked in place. (Note the relative positions of these elements in FIGURE 1.) The upper arm 12 of the yoke 11 is fashioned to receive such sleeve or bushing 40, and thus such upper arm is provided with notches corresponding to the ribs 38. Also the upper bore of the bit support 30 is likewise fashioned in this same manner, i.e., with notches or grooves 39 therein matching the ribs 38 of bushing 40. The result is that when the bushing 40 is positioned as shown in FIGURE 3, i.e., with the ribs 38 positioned in the respective grooves in both upper arm 12 and upper side (grooves 39) of the holder 30, the rotating bit element 30 is locked in place with respect to such upper arm 12 of yoke 11. It is maintained in this locked position, with the upper face thereof flush with the upper surface of arm 12, by a lock bolt 44 provided with a head 45 cut with an opening 46 suitable for insertion of the usual type of hex wrench.

At its opposite end the bolt 44 is threaded for engagement with a lock nut 50 which in turn is threaded, as at 47, for threaded engagement with the lower arm 14 of the yoke 11.

When these several elements are in the positions shown in FIGURE 3 the bit holder, and consequently the several bits, are locked in the relative position shown in solid line in FIGURE 2.

The bottom of the lock bushing 40 is bored as at 52 to provide space for a spring 55 one side of which exerts thrust or spring bias against the intermediate section 43 and the opposite end of which pushes against the bottom of the bushing 40, as shown. When it is desired to rotate the bit element for positioning a new bit in place either the bolt 46 or nut 50, or both, can be slacked off a sufficient amount to withdraw the bolt from its engagement with nut 50, whereupon the referred to spring 55 pushes bolt 44 and lock bushing 40 upwardly a sufficient distance to raise the lower end at least even with, or slightly above, the bottom surface of the arm 12. At this time the holder 31 is released, for the ribs 38 have now been withdrawn from the corresponding notches in the cutter element 30. The latter may then be rotated the desired amount (90°) to place a new bit in position. The axis of rotation will of course be the bolt 44 which is journaled, as indicated in FIGURE 3, in the intermediate section 43. Thus the bolt provides a sliding surface or pivot point about which the tool holder rotates when it is unlocked as per the foregoing, so that the holder is always properly centered for relocking thereof.

After such change has been made the assembly is again locked in the same 90° position by rotation of the holder 30 until alignment of the ribs 38 with the corresponding slots in both upper arm 12 and bit holder 30 is obtained. The bolt 44 is then rethreaded into the nut 50 so that the respective parts again assume a fixed and locked relationship, as such is shown in FIGURE 3.

From the foregoing description it will be seen that I have provided an instrument representing relative simplicity of assembly, yet one which permits of rapid bit replacement while at the same time enabling the operator to obtain further adjustment of the bit extraneous of often complex and time-consuming adjustments which are necessary for proper bit positioning as such may relate to, e.g., the cross slide and bit supporting elements of the usual type of lathe equipment. In the instant case, rapidity of operation as to bit replacement is in part achieved by a means which permits rotation of the bit holder the required 90° amount to position a new bit in place, while assuring that the holder element is ever maintained in proper axial alignment for immediate locking of the new bit in place. This is brought about by the use of the referred to locking bolt 44, which, journaled in the referred to dividing member 43 of the bit holder, provides a pivot point about which such holder is rotated. Hence the holder is simply rotated until the locking ridges upon the lock bushing are aligned with the corresponding slots in the bit holder. The assembly is then snapped in place.

In addition to this operation, and as indicated above, further adjustment of the bit is obtained by the assembly between the two yokes 8 and 11 which permits angular deviation, with respect to the tool bar, in certain increments as desired by the operator. Once this setting is made, and it is of course made independently of any lathe adjustment, it is retained during the procedure wherein the bit holder is rotated to substitute a new bit for one that has become worn.

Although other expedients and alternates, in view of the foregoing explanation, may be obvious to those skilled in the art, it is intended that my invention not be limited except as it is set forth in the following claims.

I claim:

1. A multiple bit holder for lathe and milling equipment comprising a tool bar having a yoke provided with upper and lower arms at one end thereof, a pivot pin in said yoke, a second yoke having parallel arms and a cross member therebetween, said cross member being attached to said pivot pin for rotatable movement with respect to said first yoke, set screw means threaded in said cross member for engagement with said pivot pin to independently lock said cross member and said second yoke in adjusted position with respect to said pivot pin, said pivot pin having a nut at one end thereof engaging said first yoke and a serrated end portion at the other end thereof, a complementary serrated end portion on said lower arm, whereby, on tightening said nut said yokes are locked together in predetermined position by engagement of said serrated portions, said second yoke having a rotatable bit holder therein provided with four bits spaced 90° from each other, and means to selectively rotatably position and to lock said bit holder in said second yoke in predetermined position, said means comprising a bushing having four exterior ribs corresponding to said 90° positions, apertures in one of said arms and said bit holder to accommodate said ribbed bushing, removable means to lock said bushing in said one arm and said bit holder, whereby said second yoke may be angled to one side of said tool bar and locked in place, and said bit holder may be rotated 90° to position an unused bit in cutting position and locked in said last named position.

2. The invention as defined in claim 1 wherein a spring means is positioned in between said bit holder and said bushing whereby upon loosening said removable locking means for said bushing, said bushing is thrust out of locking engagement with said bit holder.

3. The invention as defined in claim 2 wherein said removable means comprises a pivot bolt, a pivot bolt clampably journaling said bushing and said bit holder, whereby said bit holder is at all times aligned with said bushing.

4. A multiple bit holder for lathe and milling equipment comprising a tool bar having a yoke, a pivot pin in said yoke, a second yoke having parallel arms and a cross member therebetween, said cross member being attached to said pivot pin for rotatable movement with respect to said first yoke, set screw means threaded in said cross member for engagement with said pivot pin to independently lock said cross member and said second yoke in adjusted position with respect to said pivot pin, said pivot pin extending through said cross member and said first yoke, said first yoke having a serrated end portion at one end thereof, a complementary serrated end portion on said pivot pin, whereby, said yokes are locked together in predetermined position by engagement of said serrated portions, a rotatable bit holder in said second yoke, said bit holder having four bits spaced 90° from each other, and means to selectively rotatably position and to lock said bit holder in said second yoke in selective 90° positions, said means comprising a bushing having four exterior ribs corresponding to said 90° spacing, apertures in said second yoke and said bit holder to accommodate said bushing and said ribs, and means to maintain said ribbed bushing in said apertures.

5. The invention as defined in claim 4 wherein said means to maintain said ribbed bushing in said apertures comprises a pivot bolt disposed through said second yoke and axially through said rotatable bit holder, and a threaded nut means in one of said parallel arms adapted to engage said pivot bolt.

6. The invention as defined in claim 5 wherein a bias spring is positioned between said rotatable bit holder and said bushing, whereby, upon disengagement of said pivot bolt and said threaded nut means, said bias spring forces said ribbed bushing out of the aperture in said rotatable bit holder thereby disengaging said bit holder for rotational movement.

References Cited in the file of this patent

UNITED STATES PATENTS

| 2,248,931 | Anania | July 15, 1941 |
| 2,392,216 | Anania | Jan. 1, 1946 |
| 2,799,917 | Anania | July 23, 1957 |